United States Patent
Katoh

[19]

[11] Patent Number: 5,984,437
[45] Date of Patent: *Nov. 16, 1999

[54] CONNECTING LINK TYPE RUBBER CRAWLER

[75] Inventor: Yusaku Katoh, Hiroshima-ken, Japan

[73] Assignee: Fukuyama Gomu Kogyo Kabushiki Gaisha, Hiroshima-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/666,414

[22] PCT Filed: Dec. 27, 1993

[86] PCT No.: PCT/JP93/01910

§ 371 Date: Jun. 24, 1996

§ 102(e) Date: Jun. 24, 1996

[87] PCT Pub. No.: WO95/18034

PCT Pub. Date: Jul. 6, 1995

[51] Int. Cl.$^6$ ............................................. B62D 55/18
[52] U.S. Cl. ......................... 305/159; 305/160; 305/177
[58] Field of Search ..................................... 305/165, 167, 305/170, 171, 173, 175, 176, 177, 157, 158, 183, 186, 159, 160, 46, 161, 189, 202

[56] References Cited

U.S. PATENT DOCUMENTS

| | | | |
|---|---|---|---|
| 1,296,512 | 3/1919 | Hatfield | 305/46 X |
| 2,022,567 | 11/1935 | Kegresse | 305/158 |
| 2,230,935 | 2/1941 | Chevreau | 305/189 X |
| 2,410,507 | 11/1946 | Knight | 305/158 |
| 4,083,611 | 4/1978 | Schaffner et al. | 305/202 X |
| 4,861,120 | 8/1989 | Edwards et al. | 305/186 X |
| 5,255,964 | 10/1993 | Hara | 305/46 |

FOREIGN PATENT DOCUMENTS

| | | | |
|---|---|---|---|
| 55-72470 | 5/1980 | Japan | 305/177 |
| 2-12795 | 5/1986 | Japan . | |
| 1-223086 | 9/1989 | Japan | 305/177 |
| 2-96381 | 8/1990 | Japan . | |
| 4-129889 | 4/1992 | Japan | 305/189 |
| 4-133879 | 5/1992 | Japan | 305/159 |
| 4-71386 | 6/1992 | Japan . | |
| 5-278646 | 10/1993 | Japan | 305/189 |
| 5-286463 | 11/1993 | Japan | 305/160 |

Primary Examiner—Russell D. Stormer
Attorney, Agent, or Firm—Lane, Aitken & McCann, L.L.P.

[57] ABSTRACT

A connecting link type rubber crawler mounted to the traveling unit of a mobile construction machine, wherein fallout of the crawler and sinking of turning wheels hardly occur. In the endless rubber crawler, in which core bars (1) are embedded at a predetermined interval, right and left wing portions (1a) and (1a) of the core bar (1) are embedded in a rubber material of a crawler body (2) and connecting portions (m) and (m) of the core bar (1) are exposed at least on the inner peripheral side of the crawler body (2), or are covered by a thin rubber layer, while connecting portions (m') and (m') are provided at positions of the lower surface between pin holes (6) and (6) in a track link (5), an interval between the two pin holes (6) and (6) is made equal to the center-to-center interval between the adjoining core bars (1) and (1), and the track link (5) is secured to the core bars (1) from the inner peripheral side of the crawler in such a manner that the respective connecting portions (m, m) and (m', m') are superposed so as to coincide with each other vertically. On the other hand, the track links (5) and (5) disposed at a forward position and a rearward position are connected to each other by inserting pins (9) into the pin holes (6) and (6), and a pair of continuous tracks are formed by the track links at both sides of the central portion of the crawler body (2).

27 Claims, 18 Drawing Sheets

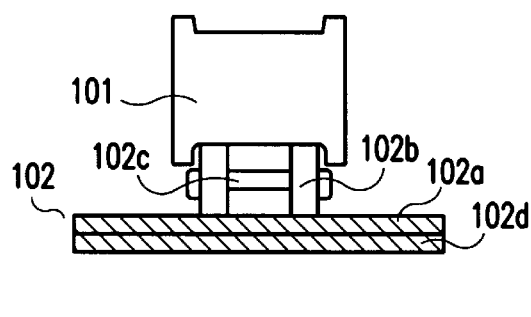
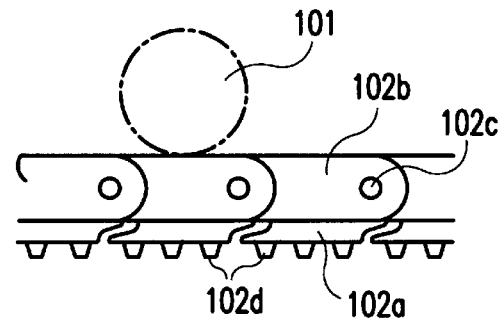
FIG. 22A  FIG. 22B
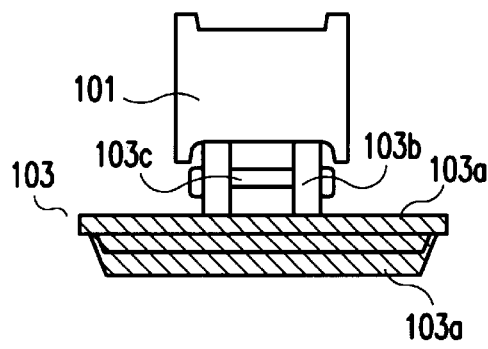
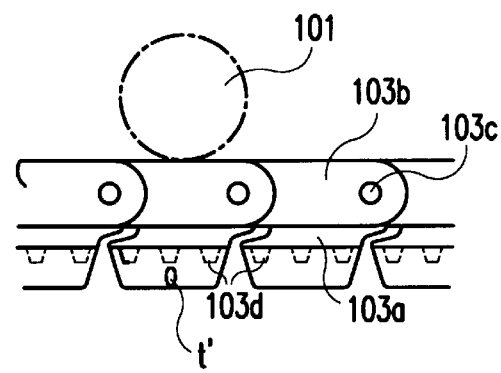
FIG. 23A  FIG. 23B
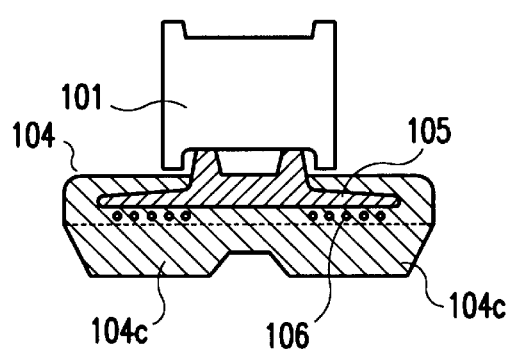
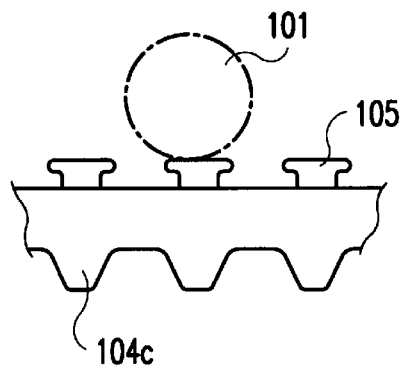
FIG. 24A  FIG. 24B

CONNECTING LINK TYPE RUBBER CRAWLER

FIELD OF THE INVENTION

The present invention relates to a connecting link type rubber crawler suitably mounted to a traveling unit of a mobile construction machine, etc.

BACKGROUND OF THE INVENTION

Conventionally, a steel crawler has been mainly applied to the traveling unit of a mobile construction machine, and a rubber shoe has been partially applied thereto. Recently, however, a rubber crawler is preferably used.

FIG. 22 is an explanatory view to describe an example of a conventional steel crawler: 101 is an outer flanged rolling wheel, 102 is a crawler shoe, 102a is a shoe plate, 102b is a track link, 102c is a linkage pin, and 102d is a lug (steel made). FIG. 23 is an explanatory view to describe an example of a rubber shoe: 103 is a rubber shoe, 103a is a shoe plate, 103b is a track link, 103c is a linkage pin, 103d is a rubber lug. FIG. 24 is an explanatory view to describe a conventional rubber crawler: 104 is a rubber crawler, 104c is a lug, 105 is a core metal, and 106 is a steel cord. In FIGS. 22–24, the same outer flanged rolling wheel can be used.

A steel crawler, wherein the upper surface of track links serves as a continuous track for a rolling wheel, effects small vibrations during traveling. Besides, it scarcely deviates from the wheel because of no elongation nor side displacement of the crawler in a circumferential or width direction. Moreover, it is excellent in durability because of strong mechanical connection between the links. However, it causes big noise and gives heavy fatigue to a driver because of its poor cushioning ability. In addition, it damages roads.

On the contrary, a rubber crawler effects small noise and has good cushioning ability without damaging roads. Besides, it is relatively lightweight so as to drive at high speed. However, it causes somewhat strong driving vibrations because an upper face of a projection of each core metal serves as a wheel track. In addition, when it receives big outer pressure in its circumferential or width direction, which causes elongation and side displacement, it deviates from the wheel. Moreover, it is inferior to the steel crawler in mechanical strength and durability.

A rubber shoe, wherein a rubber lug is provided on the ground side of a shoe plate of a steel crawler, has such structural problems that the shoe plat is apt to come off the rubber lug, and that the rubber lug is easily damaged or worn down because it is pressed between the shoe plate and the ground without any space for escape. Besides, a method of vulcanizing and fixing a rubber lug to each shoe plate highers the cost considerably. Accordingly, it can not be superior to a rubber crawler.

Therefore, an object of the present invention is to overcome the above demerits of the rubber crawler by adapting a structure of a steel crawler with its merits.

SUMMARY OF THE INVENTION

This invention, is characterized by a connecting link type rubber crawler, being endless or in a belt form, wherein core bars are embedded at suitable intervals with their longitudinal direction perpendicular to the circumferential direction of the crawler body; wherein the core bar comprises a center part having connecting portions (m), (m) for fixing track links on both sides thereof, and wing portions extending to right and left sides from the center part; wherein said right and left wing poprtions are embedded in a rubber material of a crawler body; where said connecting portions (m), (m) are exposed at least on the inner peripheral side of the crawler body or covered by a thin rubber layer to be made into a rubber shoe; wherein the track link is provided with connecting portions (m'), (m') for fixing the core bar; wherein an interval between pin holes coincides with a center-to-center interval between adjoining core bars; wherein the connecting portions (m), (m') of the core bar and the track link, respectively, are united so as to fix the track link on the core bar from the inner circumferential side of the crawler wherein one or a plurality of rubber crawler shoes are provided between the ends of the belt-formed rubber crawler body; wherein one or a plurality of rubber crawler shoes are provided between the ends of the belt-formed rubber crawler body, with the respective ends opposing to each other; wherein the upper rim of the track link projects above the rubber crawler body at a fixed height, provided the track link is fixed on the core bar; wherein the pin holes of the adjoining track links are united and a pin is inserted in the united pin hole so as to turnabley connect the adjoining track links with each other at the middle of the adjoining core bars; and wherein a pair of continuous tracks are formed on both sides of the center part of the crawler body.

This structure enables easy operation of fixing and removing to the crawler device, connection and extension of the crawler bodies in any length, and partial exchange of the body instead of exchanging the whole body when the rubber crawler is damaged, thereby effecting easy and economical operation.

Besides, it is preferable that in the rubber crawler according to claim 1 reinforcing layers should be provided above or/and under right and left wing portions of the core bar so as to increase strength of the rubber crawler shoes in the circumferential direction (as shown in claim 2).

In this invention, as shown in claim 3, the core bar whose width of the right and left wing portions almost coincides with the length of the rubber shoe in the circumferential direction is embedded in the rubber crawler shoe. Therefore, the strength of the rubber crawler shoes increases, which enables omitting reinforcing layers made of metallic fibers or highly strong synthetic fiber.

The second invention, as descibed in claim 4, is characterized by a rubber crawler, wherein the length of the rubber crawler in its circumferential direction (including an embedded core bar) almost coincides with an interval between pin holes on both sides of a track link; wherein reinforcing layers are provided above or/and under wing portions of an embedded core bar in the rubber crawler shoe; and wherein only the rubber crawler shoes are connected so as to form an endless body. This structure has the same effects.

In this case, it is preferable that the upper face of the rubber crawler shoe should be curved. With this structure, an opening between the adjoining rubber crawler shoes can be small, when they are in contact with a circular arc of a driving wheel. Besides, it seems as if the height of the lug is increased, which can decrease running slides of the rubber crawler shoes on the ground.

The third invention, is characterized by a rubber crawler, wherein the length of a rubber crawler shoe in the circumferential direction (including an embedded core bar) almost coincides with an interval between pin holes on both sides of a track link; wherein a core bar having wing portions whose width almost coincides with the longitudinal length of the rubber crawler shoe is embedded therein, wherein the upper face of the rubber crawler shoe is curved; and wherein only the rubber crawler shoes are connected so as to form an endless body. This structure has also the same effects.

In the above crawlers, it is preferable that the center part of the core bar should be concave relative to its right and left wing portions.

Moreover, in this invention, the following central lug pad can increase availability of the invention.

Namely, a central lug pad can be fixed to the center part of the core bar on its ground side. This structure extends the touching area with the ground and enables easy operations of running the device, thereby increasing working working efficiency and safety.

In this case, it is preferable that the connecting link type central lug pad should be removable. Whit this structure, the central lug pad can be exchanged when damaged.

The central lug pad is made of highly rigid and strong elastic body such as urethane rubber. According to this, durablity of the central lug pad is excellently increased. Besides, urethane rubber has spike effects under the snowy roads, since its hardness extremely increases at a low temperature.

Furthermore, it is preferable that the hardness of the central lug pad is 75°–95°, while that of the lug on the wing portions is 55°–85° so as to bring about efficient running.

BRIEF DESCRIPTION OF THE DRAWINGS

FIG. 1 relates to an embodiment of a core bar for a rubber crawler according to this invention.

FIG. 2 shows a rubber crawler body wherein core bars shown in FIG. 1 are embedded at fixed intervals.

FIG. 4 shows a piece of track link of this invention.

FIG. 5 is a partial view of the rubber crawler body in FIG. 2 having the track links in FIG. 4 fixed thereto.

FIG. 7 shows an overlapping part of the rubber crawler of this invention.

FIG. 8 relates to an embodiment of a connecting body (rubber crawler shoe) of this invention.

FIG. 9 shows a connected condition of the rubber crawler body of FIG. 7 and the rubber crawler shoe of FIG. 8.

FIG. 8D is a sectional view to describe a connected condition.

FIG. 11 relates to a further different embodiment of the rubber crawler shoe of this invention.

FIG. 12 shows an example of a core bar used in a different embodiment of this invention.

FIG. 13 shows a rubber crawler body having the core bars embedded at fixed intervals.

FIG. 14 shows a piece of track link used in this embodiment.

FIG. 15 shows an embodiment of a central lug pad of this invention.

FIG. 16 is an explanatory view to describe processes of fixing the track links and the central lug pad to the rubber crawler body.

FIG. 18 shows a different embodiment of a core bar.

FIG. 20 shows a lug pattern of a central lug pad made of urethane rubber.

FIG. 21 shows a different lug pattern of the central lug pad made of urethane rubber.

FIG. 22 is an explanatory view to describe a conventional steel crawler.

FIG. 23 is an explanatory view to describe a conventional rubber shoe.

FIG. 24 is an explanatory view to describe a conventional rubber crawler.

PREFERRED EMBODIMENTS OF THE PRESENT INVENTION

Figure 1A:
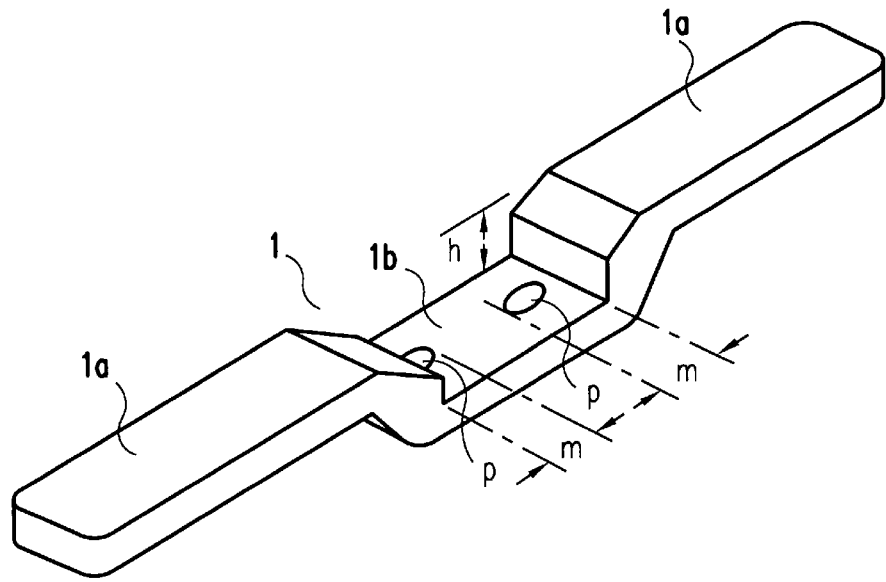
FIG. 1A is a perspective view.
Figure 1B:
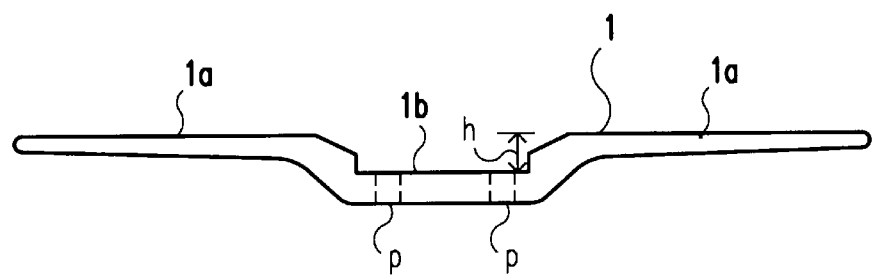
FIG. 1B is a side view.
Figure 1C:
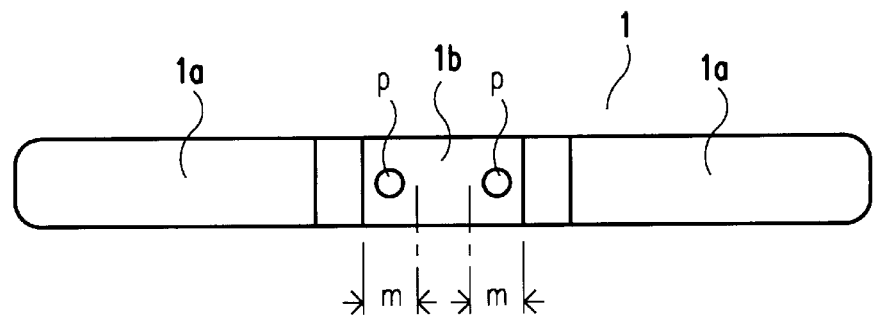
FIG. 1C is a top view.

FIG. 1 shows an embodiment of a core bar used for a rubber crawler of this invention: FIG. 1A is a perspective view, FIG. 1B is a side view, and FIG. 1C is a top view. In FIG. 1, reference number 1 is a core bar, 1a and 1a are right and left wing portions, 1b is a concave center part, m and m are connecting parts on both sides of the center part 1b for fixing later-described track links, p and p are bolt holes (through holes) provided on the connecting portions m, m, h shows a difference in height, said center part 1b being lower than the wing portions 1a.

Figure 2A:
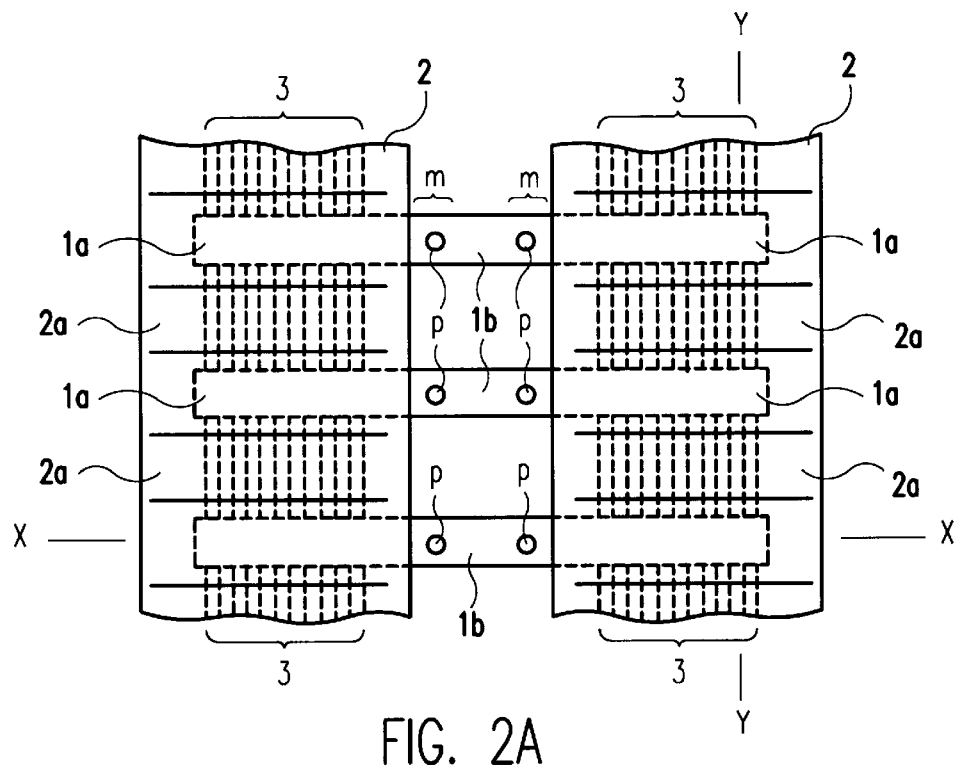
FIG. 2A is a plan view.
Figure 2B:
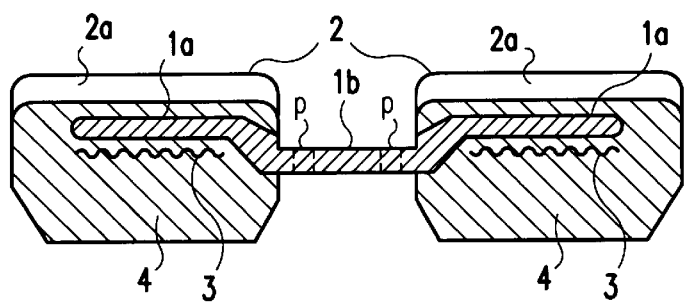
FIGS. 2B and 2C are sectional views in the lines X—X and Y—Y, respectively, of FIG. 2A.
Figure 2C:
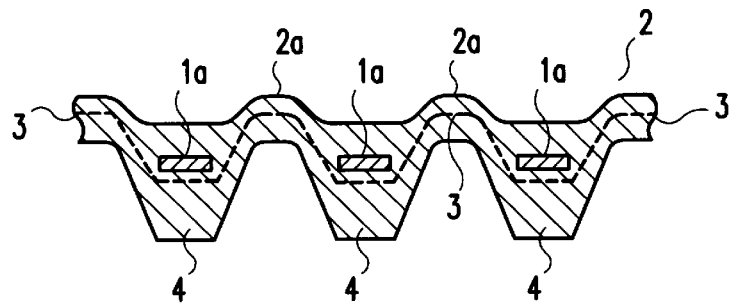
Figure 3:
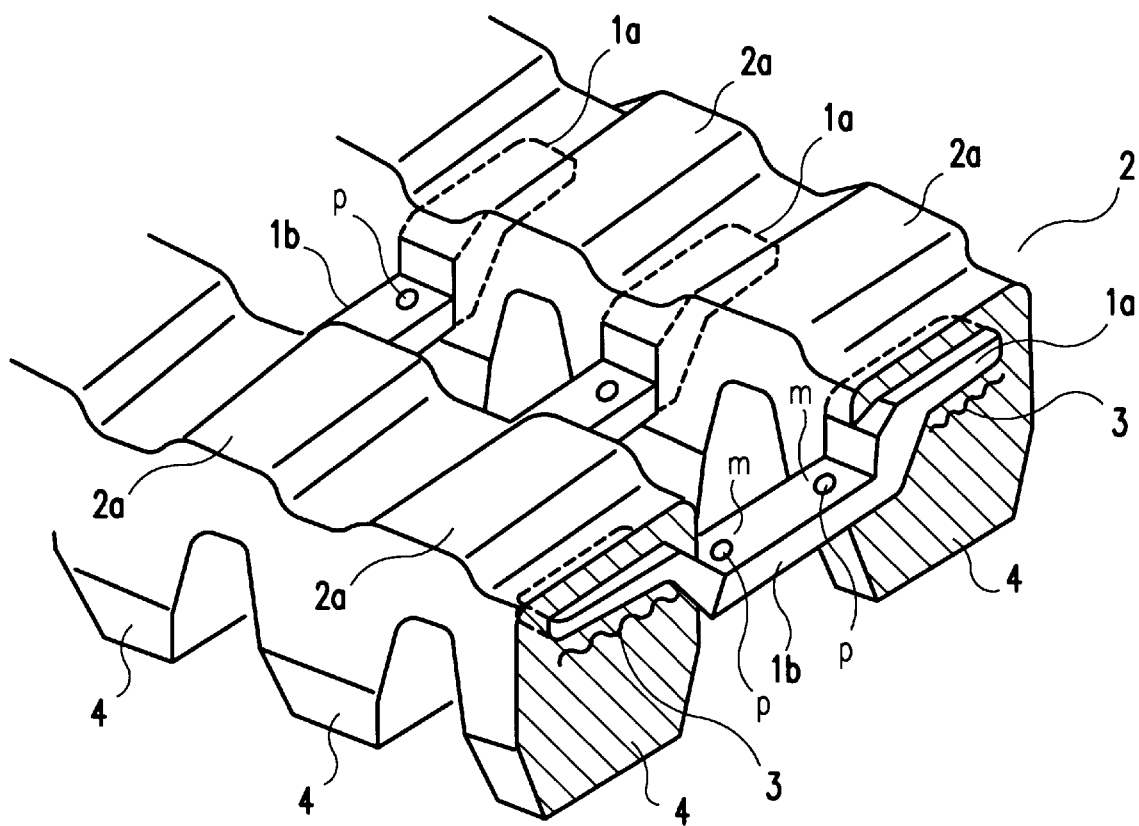
FIG. 3 shows a perspective view of the rubber crawler body shown in FIG. 2.

FIG. 2 shows a rubber crawler body 2 having the above core bars 1 embedded therein at fixed intervals: FIG. 2A is a plan view, and FIGS. 2B and 2C are sectional views in the lines X—X and Y—Y, respectively, of FIG. 2A. In this embodiment, as shown in FIG. 2, the right and left wing portions 1a, 1a are embedded in a rubber material of the rubber crawler body 2, while the bolt holes p, p and their vicinities on the center part 1b are not embedded. Reference number 2a is a curvature which is so curved that the crawler body between two wing portions 1a and 1a adjacent in a circumferential direction is raised on the inner circumferential side. In this embodiment, a reinforcing layer 3 is corrugate, since it is embedded under the wing portions 1a, as shown in FIG. 2C. Another reinforcing layer 3a is embedded above the wing portions 1a. A lug 4 projects on the outer circumferential side, corresponding to each wing portion 1a. FIG. 3 is a perspective view of the above rubber crawler body 2.

Figure 4A:
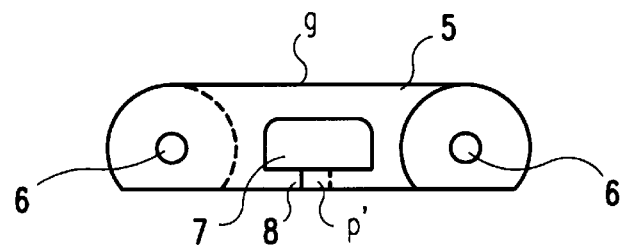
FIG. 4A is a front view and FIG. 4B is a bottom view.
Figure 4B:
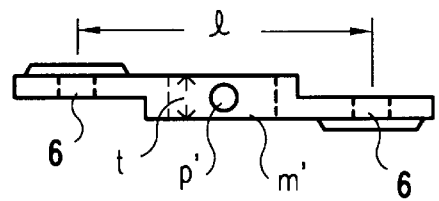

FIG. 4 shows a piece of track link 5 used in this embodiment: FIG. 4A is a front view, and FIG. 4B is a bottom view. It is the same track link as has been conventionally used for some steel crawlers. In FIG. 4, reference numbers 6, 6 are right and left pin holes, and an interval l between the pin holes coincides with an interval between core bars. Reference number 7 is a window, 8 is a lower frame of the window 7, m' is a connecting part on the lower face of the track link for being connected to the connecting part m of the core bar 1. A bolt hole p' on the connecting part m' goes through the lower frame 8, as shown in FIG. 4A. An upper face g of the track link 5 is plane, serving as a track for a wheel. The vicinities of the right and left pin holes 6, 6 are made thin (half of thickness t) oppositely on the right and left sides, so that the adjoining track links can be connected with each other in the same thickness.

Figure 5A:
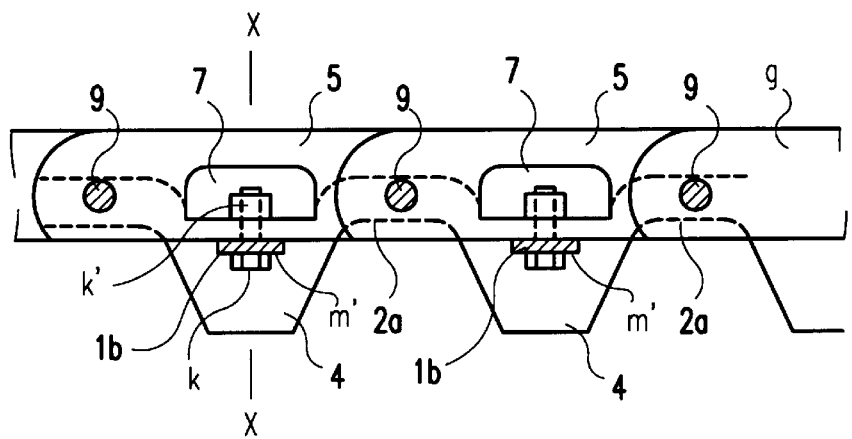
FIGS. 5A and 5B are sectional views in circumferential and width directions, respectively, of the rubber crawler.
Figure 5B:
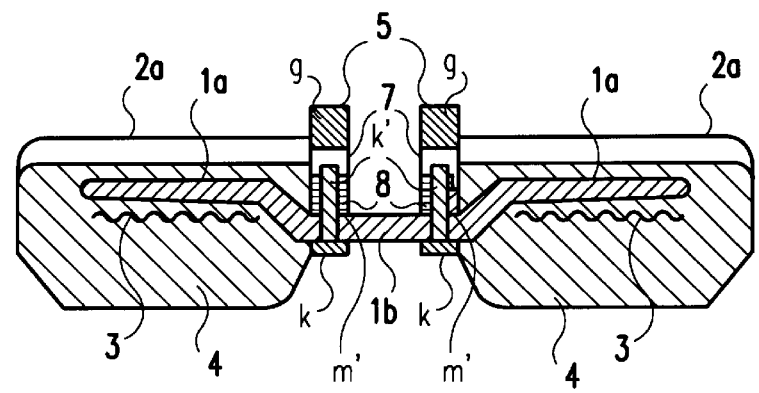

FIG. 5 is a partial view of the crawler body 2 of this embodiment having the track links fixed thereto: FIGS. 5A and 5B are sectional views in the circumferential and width directions, respectively. The above bolt hole p' and the bolt hole p of the center part 1a of the core bar are united and bolted together, so that a pair of track links 5 are installed on both sides of the center part 1a. Each pin hole 6 of the adjacent track links is overlapped with each other, and a link pin is turnably inserted into the overlapped pin hole so as to connect the track links and form a continues wheel track. Reference marks k and k' are a bolt and a nut, respectively, for connecting the track link 5 with the core bar 1, and in FIG. 5, 9 is a link pin.

Figure 6:
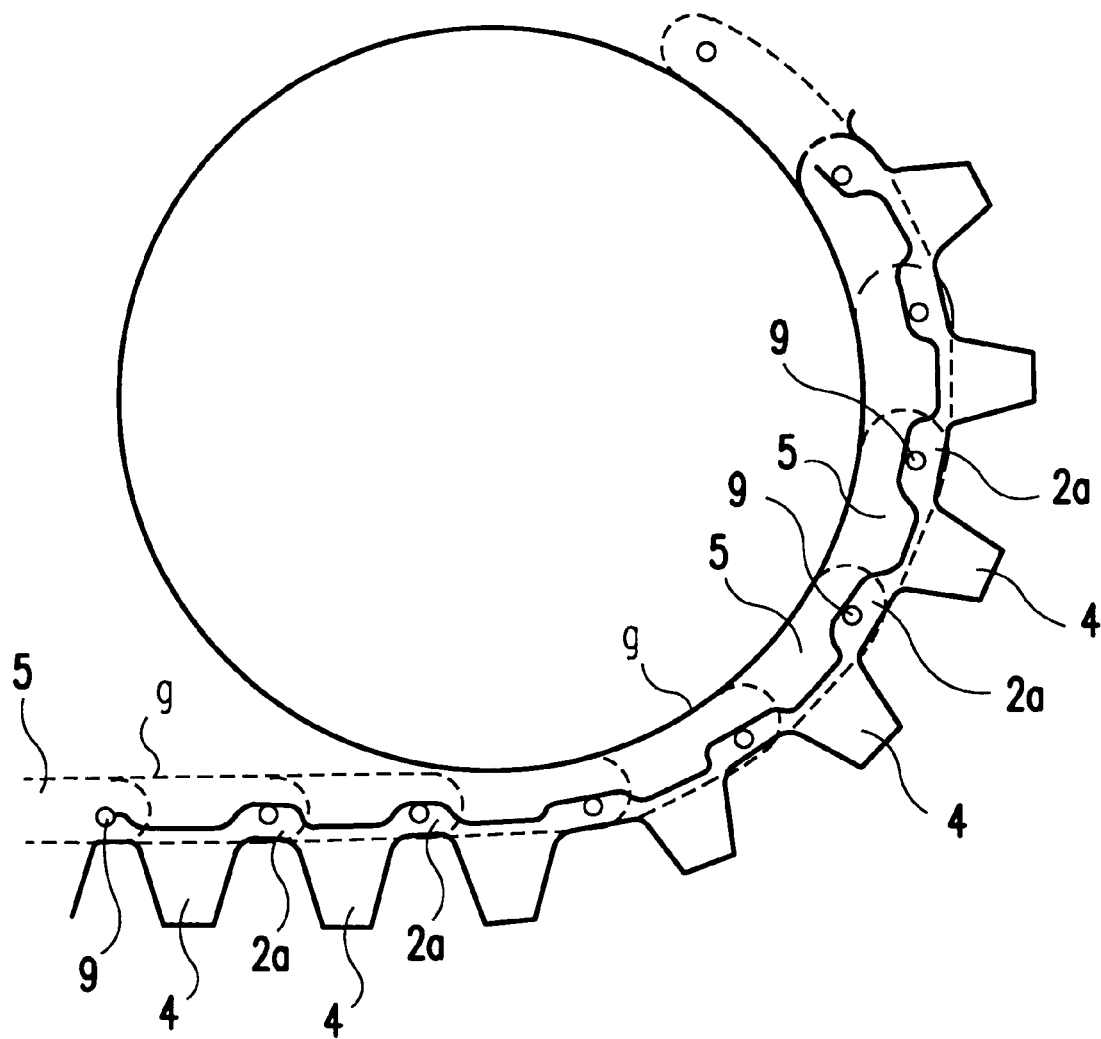
FIG. 6 is an explanatory view to describe an engaging condition of a connecting link type rubber crawler of this invention to a driving or guiding wheel.

FIG. 6 is to explain how the rubber crawler of this embodiment engages with a driving or guiding wheel. At the engaging part, the rubber crawler outside a line connecting the link pins 9, 9 . . . is elongated. An elongating rate increases according to the distance toward the outer side. The crawler body where the core bars are embedded is not elongated, while the crawler body between the embedded core bars is elongated. If the elongating rate on this part increases, the crawler body loses its durability because of repeated elongated fatigue. In this embodiment, however, the track links are fixed at a relatively lower position, since the center part 1b of the core bar is lowered for a difference h between the wing portion 1a and the center part 1b. In addition, since the curvature 2a is provided between the core bars in the crawler body, this part is heightened toward the inner circumferential side to be almost at the same height as the link pin 9. Accordingly, it is hardly elongated even at the engaging part, thereby having no problem for repeated elongated fatigue.

If the above crawler body between the core bars is made of only rubber, this part may be extremely elongated and damaged when it rides on some obstacles on roads. To prevent this, a reinforcing layer 3 may be embedded. As the reinforcing layer 3 are used natural or synthetic fiber of high intensity, cloth of metal fiber, and these kinds of fiber cords, as well as a few pieces of steel cords. The reinforcing layer 3 is preferably embedded between the core bars in the crawler body at the almost same height as the link pin because of the above reason. A plurality of reinforcing layers 3 can be used, or embedded above the core bars 1, if necessary.

In the above embodiment, the core bar 1 and the track link 5 can be connected by means other than bolting: The connecting parts m and m' of the core bar and the track link, respectively, can be put together by arc welding, or other means. The connecting part m of the core bar 1 on the inner circumferential side of the crawler body is exposed or covered with a thin rubber layer in relation with the above connecting means to be paired with the track links. Besides, the connecting part m on the outer circumferential side can be exposed or covered with a rubber layer (regardless of thickness of rubber), in relation with the above connecting means. In this case, the center part 1b except the connecting parts m, m of the core bar 1 can be covered with rubber in any width and any shape.

In this invention, the crawler body can be in a belt form. In this case, the track links fixed to one end of the crawler body are connected with the track links fixed to the other end to form an endless crawler. In this case, one belting crawler body or a plurality thereof may be used to make a endless crawler body.

Figure 7A:
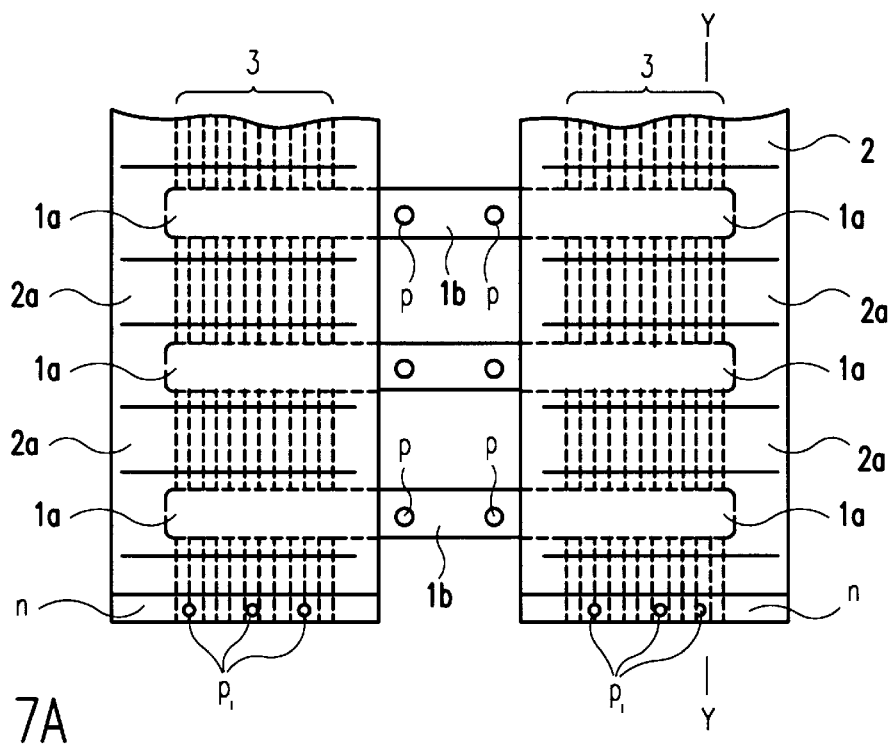
FIG. 7A is a plan view (on the inner circumferential side)
Figure 7B:
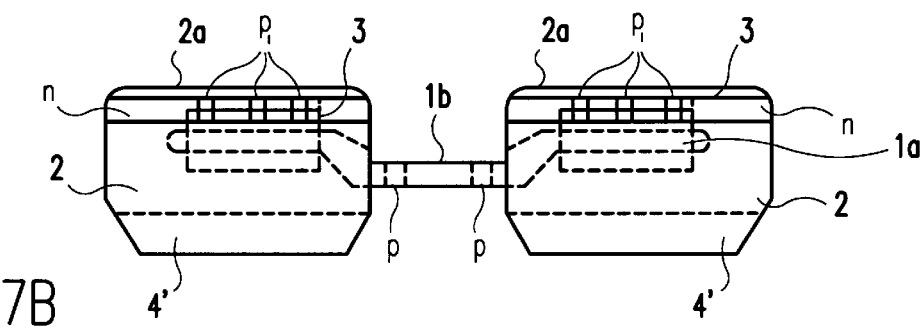
FIG. 7B is a front view.
Figure 7C:
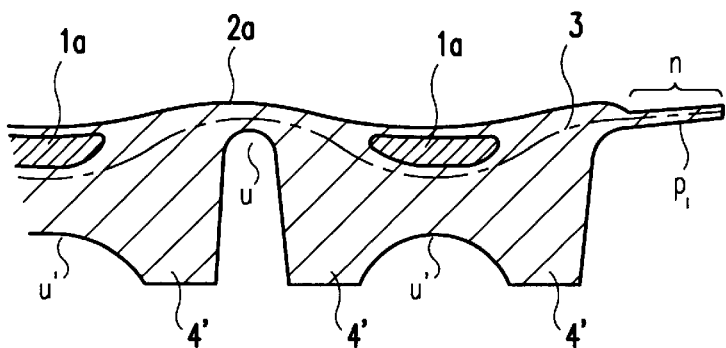
FIG. 7C is a sectional view in the line Y—Y of FIG. 7A.
Figure 8A:
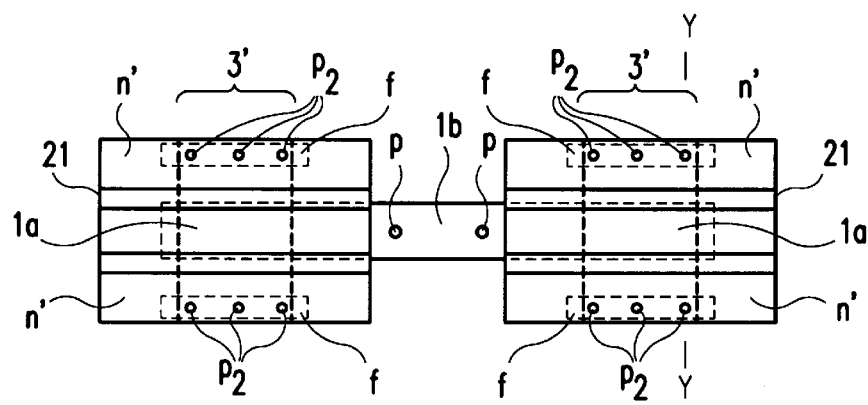
FIG. 8A is a plan view (on the inner circumferential side)
Figure 8B:
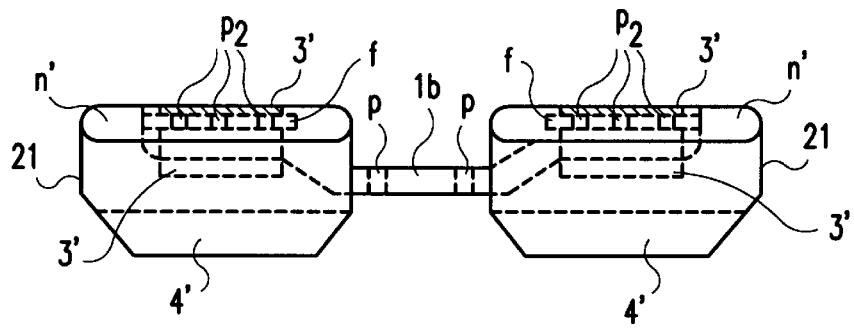
FIG. 8B is a front view.
Figure 8C:
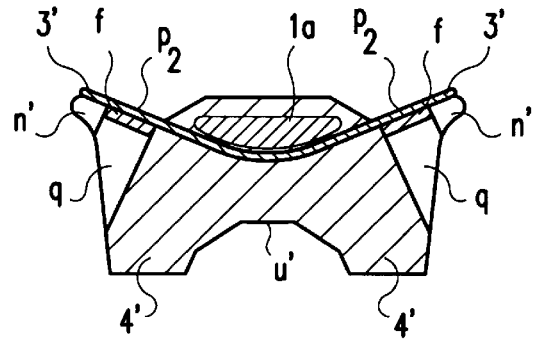
FIG. 8C is a sectional view in the line Y—Y of FIG. 8A.
Figure 8D:
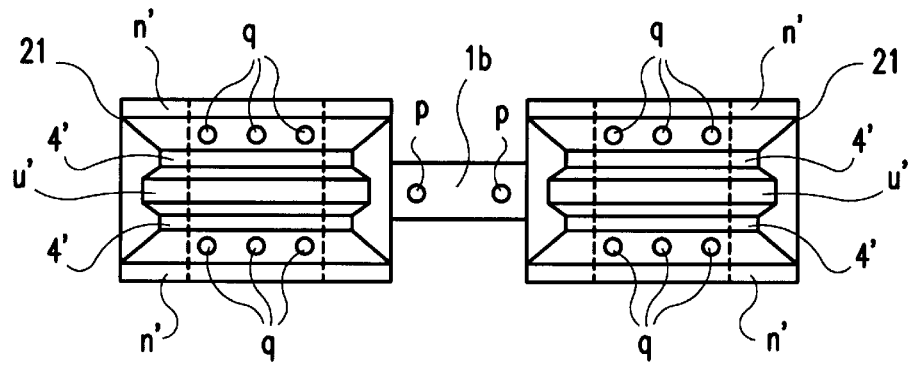
FIG. 8D is a plan view (on the ground side).

FIGS. 7–9 relates to an embodiment for connecting ends of the belting crawler body. FIG. 7 shows an overlapping part n of the crawler body 2: FIG. 2A is a plan view (on the inner circumferential side), FIG. 2B is a front view, and FIG. 7C is a sectional view in the line Y—Y of FIG. 2A. As shown in FIG. 7, the overlapping part n is thinly provided to an end of the crawler body 2, and a reinforcing layer 3 is embedded therein almost to a tip end thereof. Reference mark p1 is a bolt hole for connecting a later-described connecting body, being provided at a suitable portion within the width of the reinforcing layer 3. Reference number 4' is a lug, u and u' are concaves between the lugs. In this embodiment, a shallow concave u' is provided under the wing portion 1a of the core bar, and lugs 4', 4' are provided on both sides thereof. Accordingly, collapse of the crawler is small when a wheel rolls between the core bars. Even when the wheel passes above the core bars, suitable cushioning effect enables comfortable driving. A curvature 2a is heightened to make a deep concave u thereunder, thereby having no inner distortion of rubber on this part during engaging with a driving or guiding wheel.

FIG. 8 shows a rubber crawler shoe 21: FIG. 8A is a plan view (on the inner circumferential side), FIG. 8B is a front view, FIG. 8C is a sectional view in the line Y—Y of FIG. 8A, and FIG. 8D is a plan view (on the ground side). In FIG. 8, n' is an overlapping part for being connected with the above overlapping part n of the crawler body 2. Reference number 3' is a reinforcing layer, f is a wear plate, and P2 is a bolt hole. As shown in FIG. 8, the reinforcing layer 3' is embedded in almost full length of the rubber crawler shoe 21. A bolt hole P2 is provided for connecting the reinforcing layer 3 with the wear plate f embedded thereunder at the overlapping part n'. In this case, the bolt hole p2 is so arranged that it coninsides with the bolt hole p1 when the overlapping part n' and the above overlapping part n of the crawler body are united. The reinforcing layer 3' may be made of the same materials as the above reinforcing layer 3, or a thin metalic plate (suitably bent), or wire netting. Reference mark q is a hole for inserting a bolt from the ground side.

In this embodiment, the wear plate f is embedded in the rubber crawler shoe 21 in advance, so that the hole q is provided only at the bolt hole p2. In other case, wherein the rubber crawler shoe 21 is prepared without the the wear plate f, a hole q big enough for receiving the wear plate f is provided, and the wear plate f is fixed to the rubber crawler shoe 21 later. Besides, a bolt k (see FIG. 9) may be embedded in the rubber crawler shoe together with the wear plate f (in this case, a threaded part of the bolt k is exposed on the inner circumferential side of the rubber crawler shoe 21 through the bolt hole of the reinforcing layer 3'), thereby having no hole for inserting the bolt.

Figure 9A:
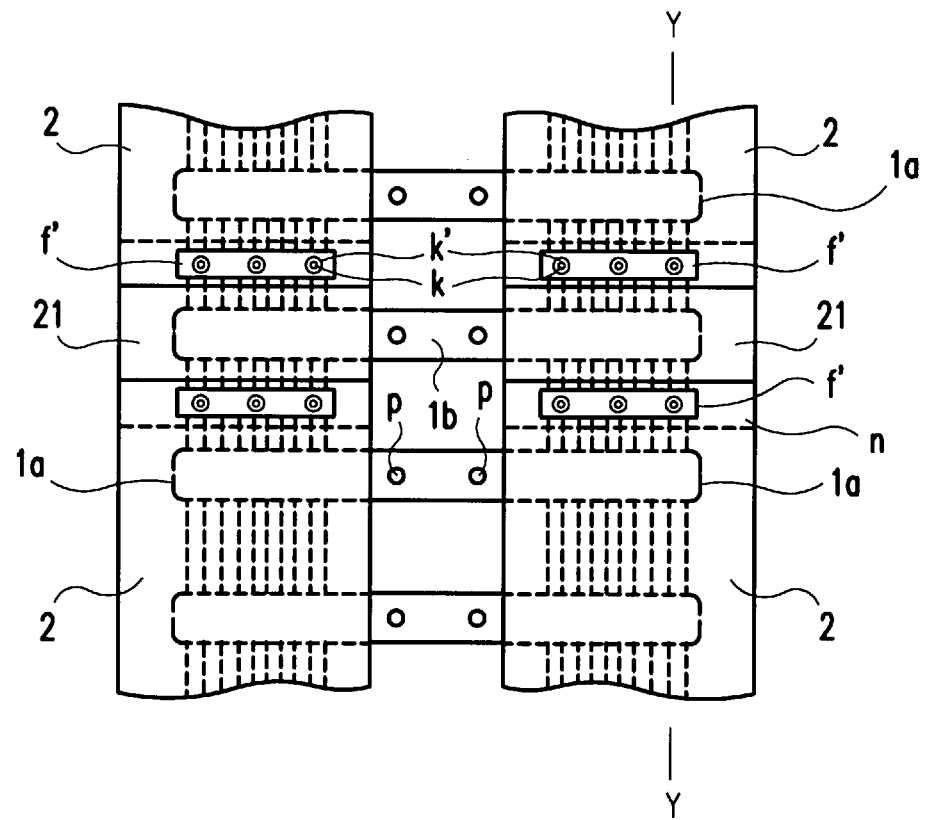
FIG. 9A is a plan view (on the inner circumferential side) and FIG. 9B is a sectional view in the line Y—Y of FIG. 9A.
Figure 9B:
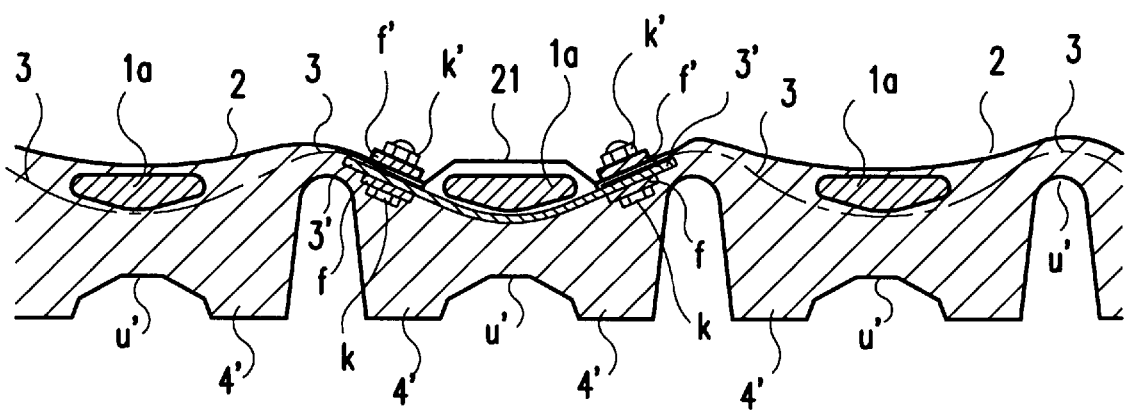
Figure 10A:
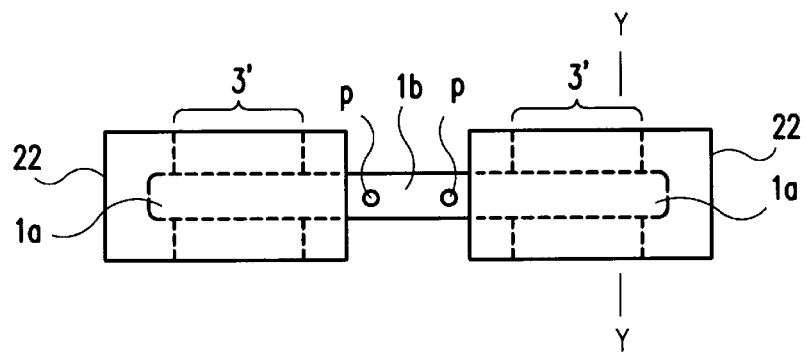
FIG. 10A is a plan view (on the inner circumferential side)
Figure 10B:
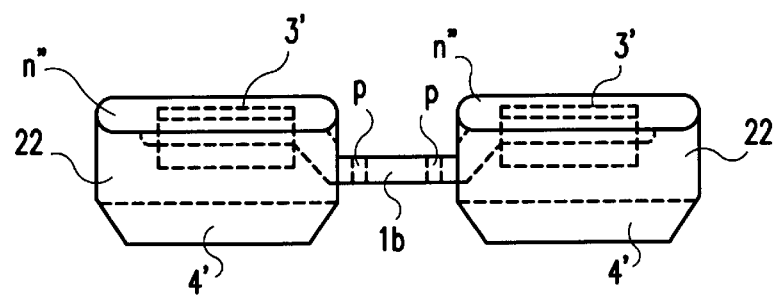
FIG. 10B is a front view.
Figure 10C:
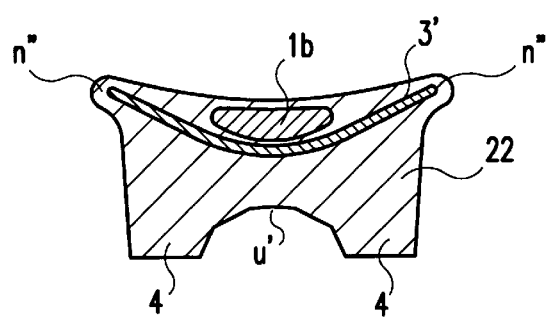
FIG. 10C is a sectional view in the line Y—Y of FIG. 10A.
Figure 10D:
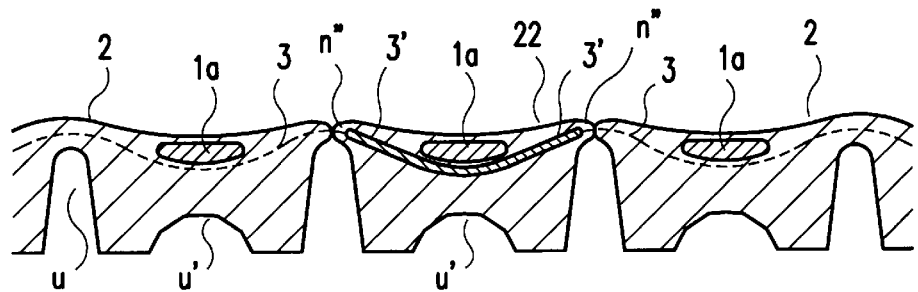
FIG. 10 relates to a different embodiment of the rubber crawler shoe of this invention.

FIG. 9 shows how the crawler body 2 is connected with the rubber crawler shoe 21: FIG. 9A is a plan view (on the inner circumferential side), and FIG. 9B is a sectional view in the line Y—Y of FIG. 9A. As shown in FIG. 9, the rubber crawler shoe 21 is provided between the crawler bodies 2. The overlapping parts n and n' are united, and the wear plate f' on the inner circumferential side and the wear plate f on the outer circumferential side are firmly bolted at the united part. In this invention, as described before, the adjoining track links are fixed to the bolt holes p, p on both sides of the center part 1b of the core bar, and connected with each other. Accordingly, mechanical strength in a circumferential direction increases, and the reinforcing layers 3 and 3' of the crawler body 2 and the rubber crawler shoe 21, respectively, are connected, and become endless in a full circle. In this embodiment, the overlapping parts n' may be formed on both ends of the crawler body 2 to be connected with the overlapping parts n formed on both ends of the rubber crawler shoe 21. Besides, on one end of the crawler body 2 may be formed the overlapping part n, while on the other end may be formed the overlapping part n', so that both ends are directly united and connected.

FIG. 10 relates to other embodiment of the rubber crawler shoe: FIG. 10A is a plan view of a connecting body 22 in this embodiment (on the inner circumferential side), FIG. 10B is a front view thereof, FIG. 10C is a sectional view in the line Y—Y of FIG. 10A, and FIG. 10D is a sectional view showing a connecting condition. As shown in FIGS. 10A–10C, the rubber crawler shoe 22 has upward curving protrusions n" on each end in the circumferential direction, the reinforcing layer 3' is embedded therein in almost full length thereof. As shown in FIG. 10D, the rubber crawler shoe 22 is arranged between the the crawler bodies 2, 2, and the track links fixed on the inner circumferential side are connected with each end of the rubber crawler shoe 22 and the crawler body 2 in touch. In this case, the crawler body 2 has no overlapping part on their ends as the rubber crawler shoe 22. Besides, it is possible to form an endless body in a full circle only with the rubber crawler shoes 22 (the track links fixed on the inner circumferential side of the rubber crawler shoe 22 are connected in a full circle to be endless). In this case, the rubber crawler shoe 22 has the same function as a conventional rubber shoe.

In the endless body comprising only rubber shoes 22 in its full circle, the upper surface of the rubber crawler shoe 22 is so curved that both ends thereof can be about at a height of the link pin 9. The protrusions n" protrude beyond the rest of the rubber shoe 22 in the width direction of the shoe, as they do on the rubber shoe 23 in the embodiment of FIG. 11. Accordingly, when the endless body engages with a driving or guiding wheel, an opening between adjoining rubber crawler shoes 22 becomes small enough to prevent extraneous substances from biting into the driving wheel therethrough. Besides, when the rubber crawler shoes 22 roll on the ground, the heightened ends form a high concave u between lugs as if increasing the lug's height. Accordingly, mud comes into the concave u effectively, thereby decreasing slips during driving.

Figure 11A:
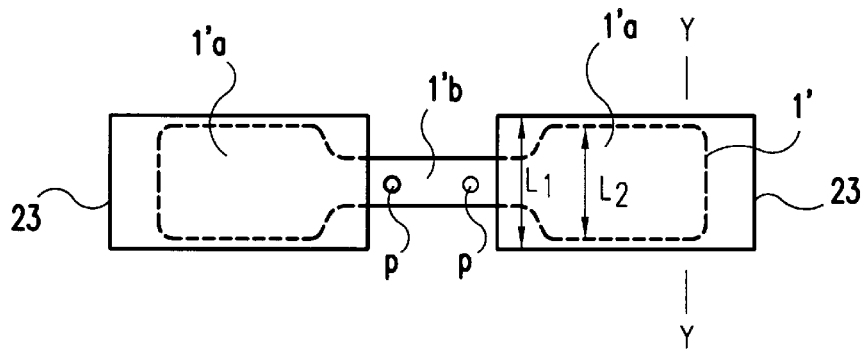
FIG. 11A is plan view (on the inner circumferential side)
Figure 11B:
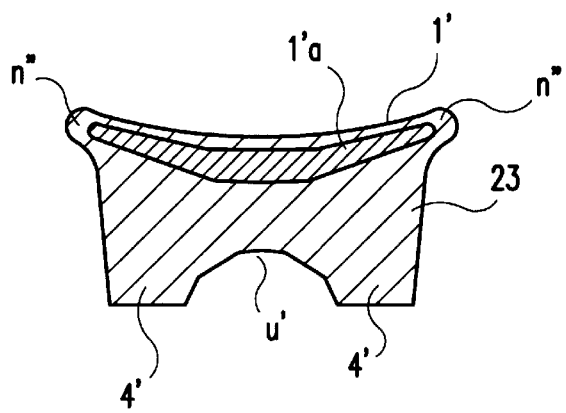
FIG. 11B is a sectional view in the line Y—Y of FIG. 11A.
Figure 11C:
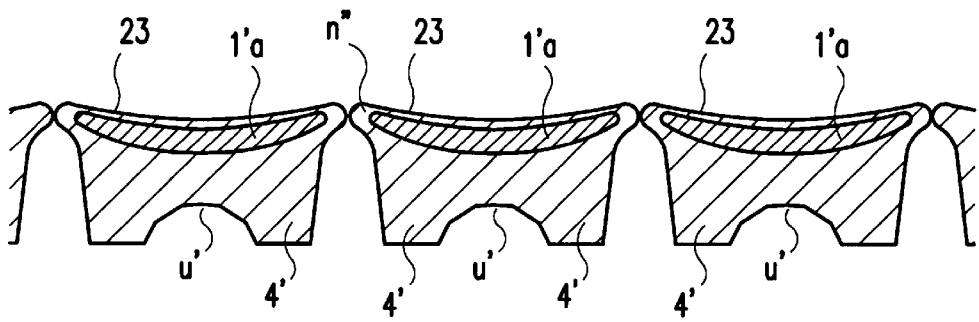
FIG. 11C is a sectional view to describe a connected condition.

FIG. 11 relates to a further different embodiment: FIG. 11A is plan view of a rubber crawler shoe 23 of this embodiment (on the inner circumerential side), FIG. 11B is a sectional view in the line Y—Y of FIG. 11A, and FIG. 11C is a sectional view showing a connecting condition. In FIG. 11, 1' is a core bar embedded in the rubber crawler shoe 23, 1'a and 1'b are a wing portion and a center part, respectively. A width L2 of the wing portion 1'a almost coincides with a circumferential length L1 of the rubber crawler shoe 23. As shown in FIG. 11C, it is possible to compose an endless body only with the rubber crawler shoes 23. Besides, the rubber crawler shoe 23 can be disposed between the belting crawler bodies for connection, as in the same manner as the embodiment shown in FIG. 10D.

In the above embodiment, at the center position of the lower face of the track link, it is fixed to the center part of the core bar. This invention, however, is not limited to this. The track links can be shifted in the circumferential direction relative to the center part of the core bar for connection.

Figure 12A:
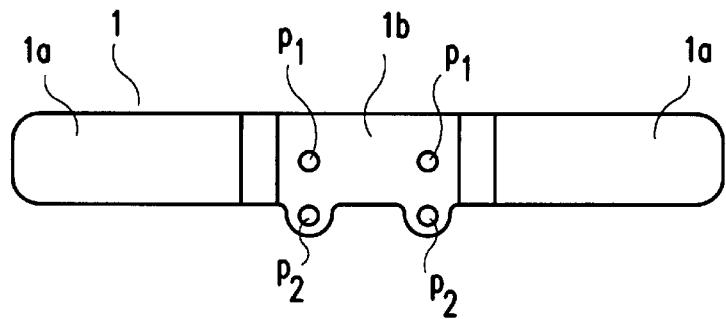
FIG. 12A is a top view.
Figure 12B:
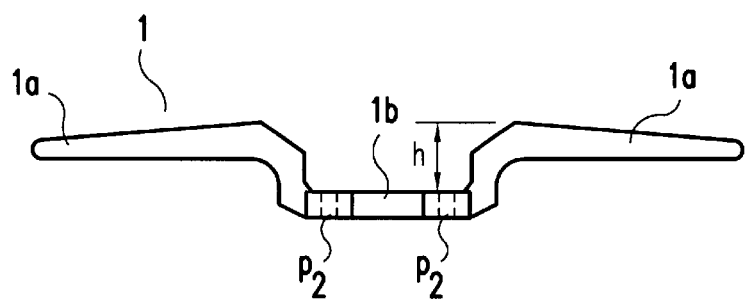
FIG. 12B is a side view.
Figure 12C:
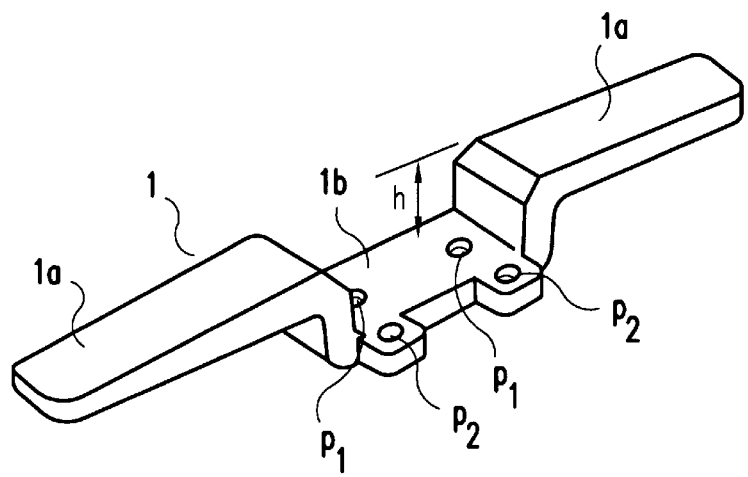
FIG. 12C is a perspective view.

An explanation for a different embodiment follows. FIG. 12 shows an example of a core bar in this embodiment: FIG. 12A is a top view, FIG. 12B is a side view, and FIG. 12C is a perspective view. In FIG. 12, 1 is a core bar, 1a and 1a are right and left wing portions, 1b is a center part, and h is a height difference. The center part 1b is lower than the wing portion 1a. Reference marks p1, p1, and p2, P2 are bolt holes (through holes) at both sides of the center part 1b for fixing later-described central lug pads and the track links, respectively.

Figure 13A:
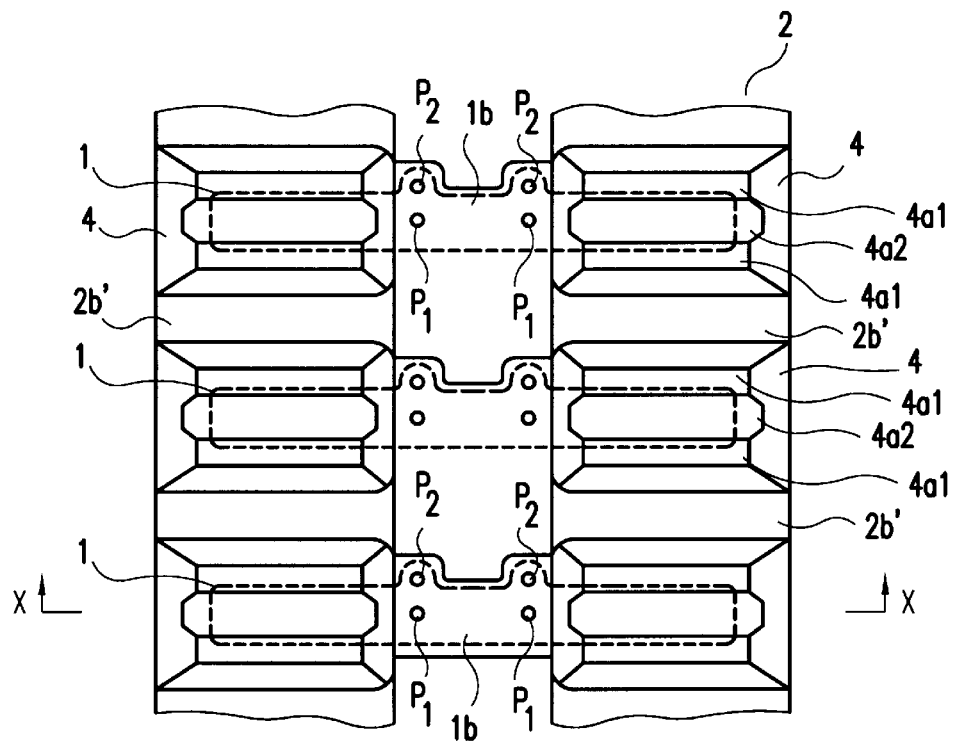
FIG. 13A is a plan view (on the ground side)
Figure 13B:
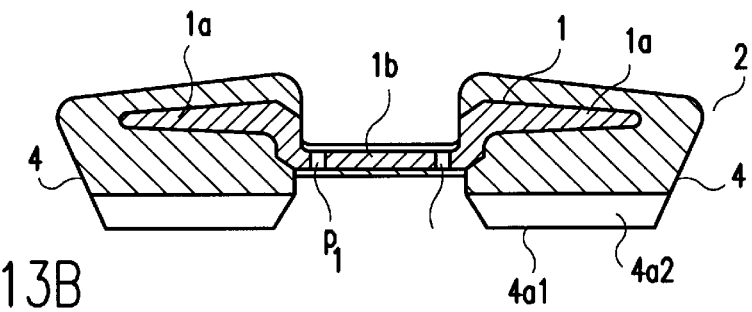
FIG. 13B is a sectional view in the line X—X of FIG. 13A.

FIG. 13 shows a rubber crawler body 2 having the above core bars 1 embedded therein at fixed intervals: FIG. 13A is a plan view (on the ground side), and FIG. 13B is a sectional view in the line X—X of FIG. 13A. As shown in FIG. 13, the right and left wing portions 1a, 1a are embedded in rubber material of the rubber crawler body 2, while the center part 1b is not embedded therein. As can best be seen from FIG. 13B, in this embodiment, a thin rubber layer covers the center part 1b. Reference number 4 is a lug, 4a1, 4a2 are a top face and a trough, respectively, of the lug 4, and 2b' is a concave formed between the lugs. The lug 4 is provided at a position where the wing portion 1a is embedded. The shallow trough 4a2 is provided between the top faces of the lug 4, while the deep concave 2b' is formed at a portion where the core bar is not embedded between the lugs 4.

Figure 14A:
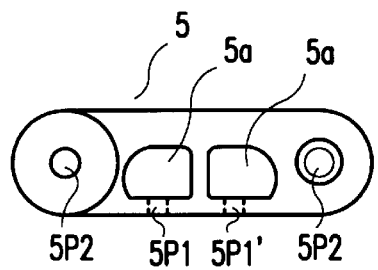
FIG. 14A is a front view.
Figure 14B:
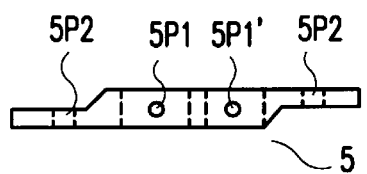
FIG. 14B is a bottom view.

FIG. 14 shows a piece of a track link used in this embodiment: FIG. 14A is a front view, and FIG. 14B is a bottom view. It is the same track link as has been conventionally used for some steel crawlers. In FIG. 14, 5a is a window, 5p1, 5p1' are bolt holes, and 5p2, 5p2 are pin holes for receiving connecting pins.

Figures 15A, 15B:
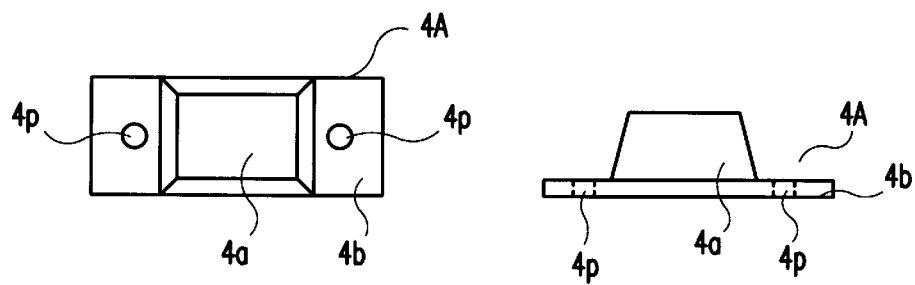
FIG. 15A is a front view, and FIG. 15B a sectional view.

FIG. 15 shows one embodiment of a center lug pad of this invention: FIG. 15A is a front view, and FIG. 15B is a side view. In FIG. 15, 4A is a central lug pad, 4a is a lug, 4b is a core plate (an iron plate), and 4p is a bolt hole. The lug 4a is firmly fixed on the core plate 4b by the following method, etc. Namely, the core plate 4b whose surface is buffed, degreased, and treated with adhesives in advance, is placed in a metal mold with a suitable amount of unvulcanized rubber, and pressed and vulcanized for a fixed time. The interval of the right and left bolt holes 4p, 4p coincides with that of the bolt holes p1, p1 on the center part 1b of the above core bar.

Figure 16A:
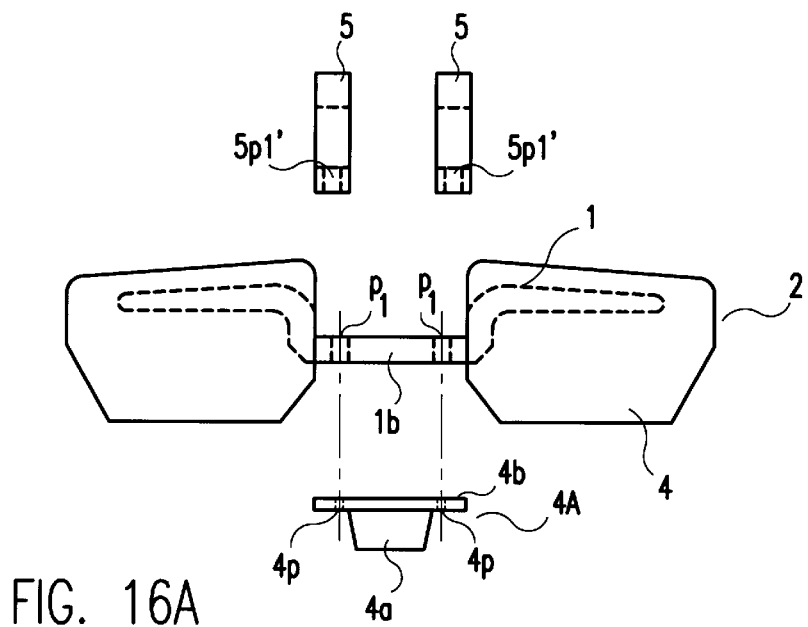
FIG. 16A is a side view showing each arrangement.
Figure 16B:
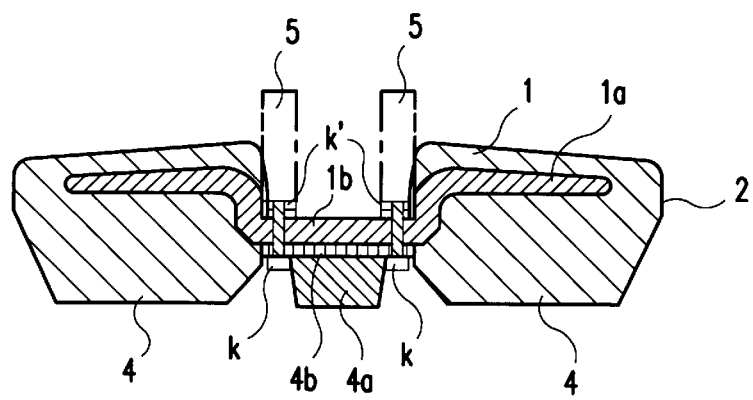
FIG. 16B is a sectional view showing a fixed condition.

FIG. 16 is an explanatory view to describe processes for fixing the track links 5 and the central lug pad 4A to the rubber crawler body 2: FIG. 16A is a side view showing each arrangement, and FIG. 16B is a sectional view showing a fixing condition. As described before, the bolt holes 5p1, 5p1 of the right and left track links 5, 5 are united with the bolt holes p2, p2 of the center part 1b of the core bar, and bolted together. The bolt holes 4p, 4p of the central lug pad 4A are united with the bolt holes p1, p1, and the bolt holes 5p1', 5p1', and bolted together. In FIG. 16, reference marks k, k' are a bolt and a nut, respectively.

Figure 17:
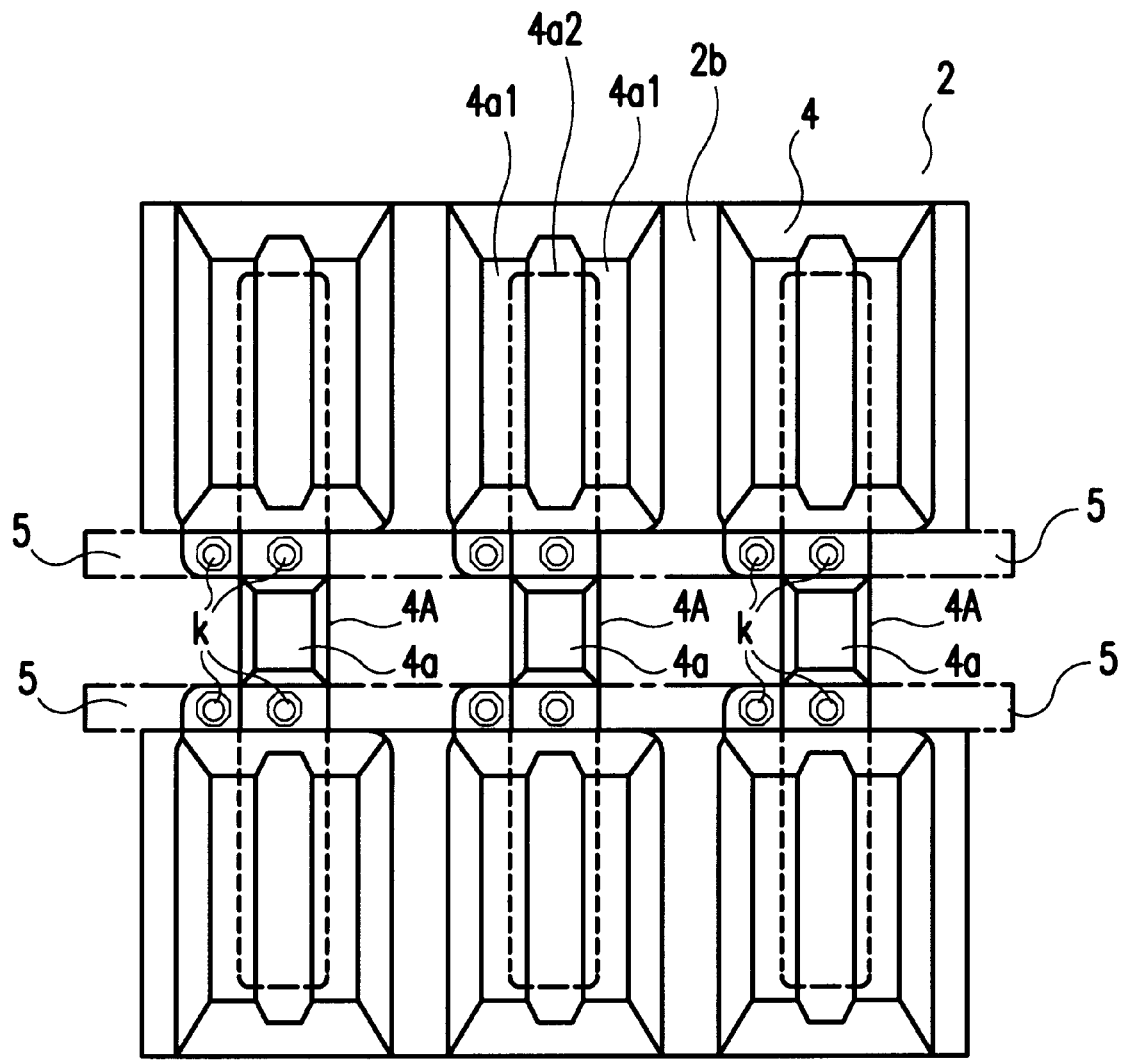
FIG. 17 is a plan view, showing the rubber crawler body having the central lug pads fixed thereto on the ground side.
Figure 18A:
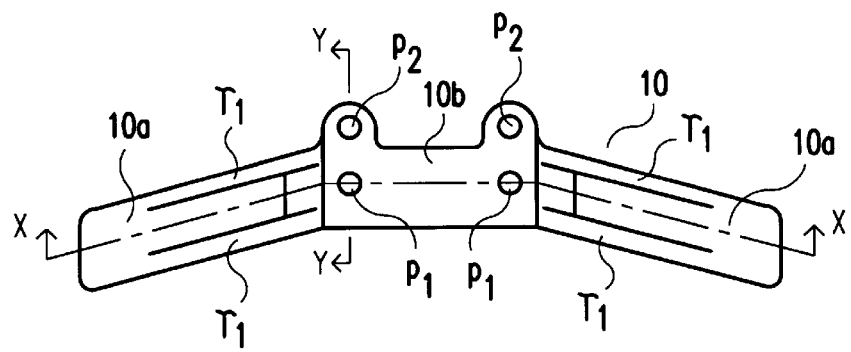
FIG. 18A is a top view.
Figure 18B:
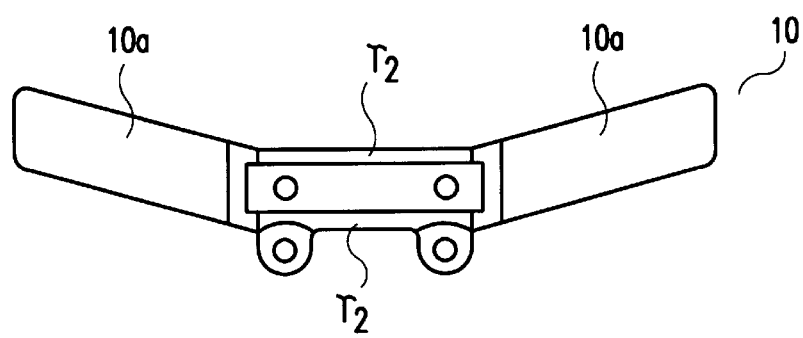
FIG. 18B is a bottom view.
Figure 18C:
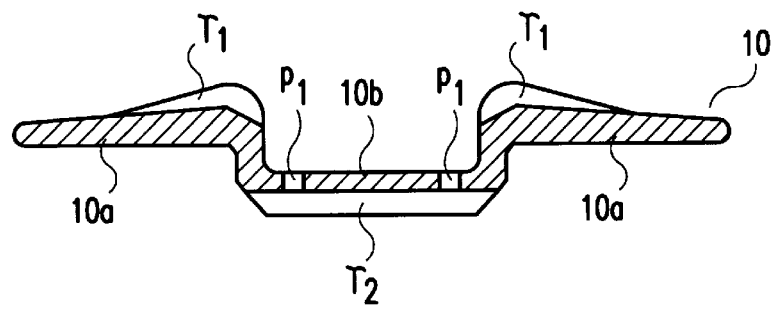
FIGS. 18C and 18D are sectional views in the lines X—X and Y—Y, respectively, of FIG. 18A.
Figure 18D:
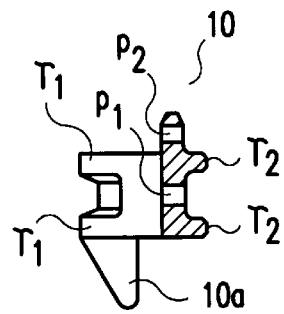

FIG. 17 is a plan view, showing the rubber crawler body 2 having the central lug pads 4A fixed on the ground side. In this embodiment, the track link and the central lug pad are fixed on the center part of the core bar through different bolt holes, respectively. Accordingly, the central lug pads can be fixed or removed separately from the track links.

FIG. 18 shows a different embodiment 10 of the core bar: FIG. 18A is a top view, FIG. 18B is a bottom view, FIGS. 18C and 18D are sectional views in the lines X—X and Y—Y, respectively, of FIG. 18A. In FIG. 18, 10a, 10a are right and left sweepback wing portions, 10b is a center part, and r1, r2 are reinforcing ribs. The reinforcing ribs r1, r2 are to reinforce the wing portions 10a and the center part 10b, provided at the positions shown in FIG. 18A.

This invention, however, is not limited to the above embodiment. Only one pair of the bolt holes may be provided on the center part of the core bar, so that the bolt hole of the track link and the bolt hole of the central lug pad should be united with the bolt hole of the center part from the upper side and the lower side, respectively, and bolted and fixed together by means of a common bolt. Besides, a material of the lug 4a of the above central lug pad 4A is not limited to the same rubber material as the rubber crawler body, but elastic rubber having excellent durability such as urethane rubber, etc. can be also used.

Figure 19:
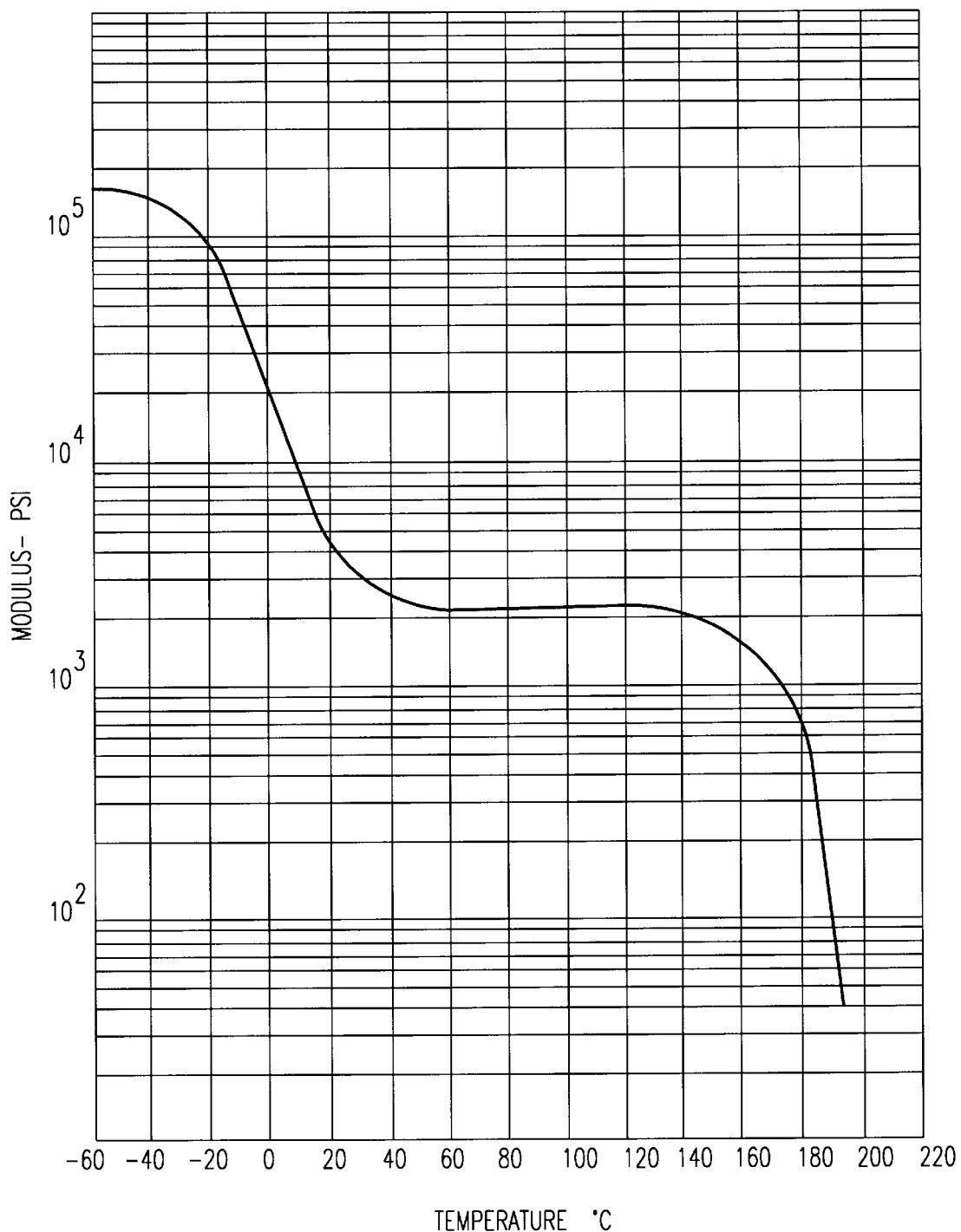
FIG. 19 is a graph showing a relationship between hardness and temperature of urethane rubber, wherein the vertical axis shows modulus of a logarithm (tensile strength for 85% elongation (unit (PSI)) and the horizontal axis shows temperature (° C.).

FIG. 19 is a graph showing a relationship between hardness and temperature of urethane rubber, wherein the vertical axis shows modulus of a logarithm (tensile strength for 85% elongation (unit PSI)) and the horizontal axis shows temperature (° C.). According to this graph, hardness increases radically around below 20° C. This means that urethane rubber has excellent elasticity at normal temperature in a workshop, while it turns to a highly rigid body below the freezing point. In other words, urethane rubber nomally has suitable hardness on the roads, while it turns to a highly rigid body on the snow ground in winter, functioning as spikes. Accordingly, the body can be easily driven and operated, thereby increasing working efficiency and safety.

Figure 20A:
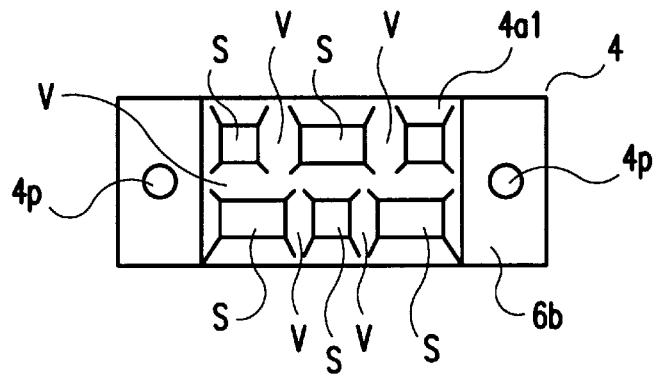
FIG. 20A is a bottom view.
Figure 20B:
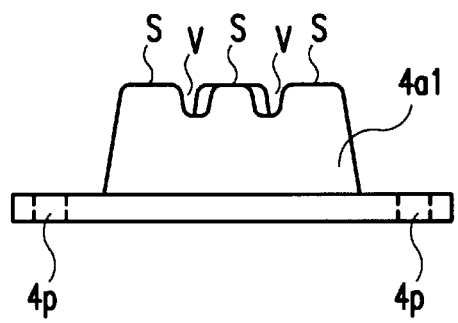
FIG. 20B is a side view.
Figure 21A:
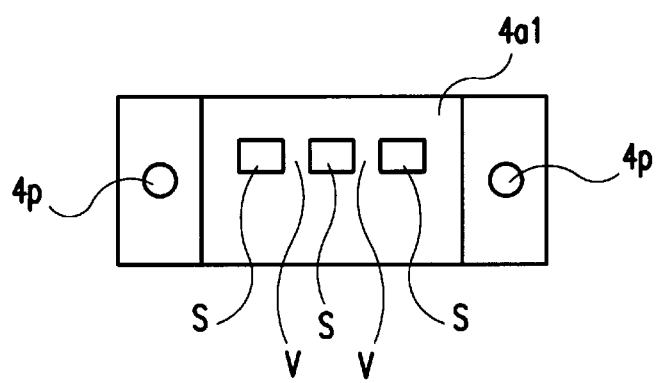
FIG. 21A is a bottom view.
Figure 21B:
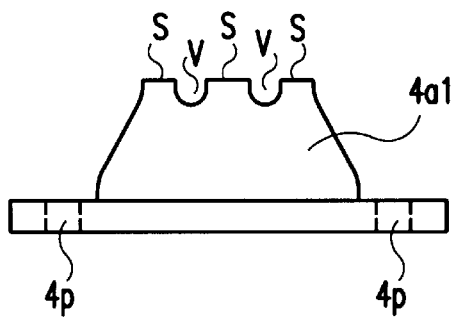
FIG. 21B is a sectional view.

FIGS. 20 and 21 show embodiments of lug patterns for the central lug pad made of urethane rubber: FIGS. 20A and 21A are bottom views, and FIGS. 20B and 21B are side views. In each figure, 4a1 is a lug made of urethane rubber, s is a top face of the lug 4a1, and v is a trough. As shown in these figures, the trough v having steep slops is provided on the top face of the lug 4a1, thereby increasing spike effects on the snow ground.

The lug of the above central lug pad can be made of metals or hard plastics, etc., so as to be used exclusively as spikes on the snow ground.

The height of the lug of the central lug pad is decided according to its purpose. If the lug is used exclusively as spikes on the snow ground, the middle part of the lug may be heightened than the side parts on the ground side.

In this embodiment, the lug pads are removable, but they can be fixed to the core bars so as not to be removed.

I claim:

1. A connecting link type rubber crawler, comprising:
    a crawler body made of a rubber material, said crawler body defining an inner peripheral side and opposite ends;
    a plurality of core bars each including a center part having connecting portions (m), (m) for fixing track links on both sides of the center part, and right and left wing portions extending laterally from the center part, wherein said right and left wing portions are embedded in the rubber material of the crawler body, and said connecting portions (m), (m) have one of the characteristics of (A) being exposed at least on the inner peripheral side of the crawler body and (B) being covered by a thin rubber layer;
    a plurality of track links each having pin holes and connecting portions (m'), (m') for fixing the core bars to the links, wherein an interval between the pin holes coincides with a center-to-center interval between adjoining core bars;
    wherein each said track link is fixed to a said core bar from the inner circumferential side of the crawler so that the respective connecting portions (m), (m') of the core bars and the links are united with each other;
    wherein at least one rubber crawler shoe is interposed between the ends of the crawler body when the crawler body is arranged in the form of a belt with the ends near to each other;
    wherein each track link has an upper rim projecting above the rubber crawler body at a fixed height when the track link is fixed on a said core bar;
    wherein the pin holes of adjoining track links are in alignment and pins are positioned in the aligned pin holes so as to pivotally connect the adjoining track links with each other at the middle of the adjoining core bars; and
    wherein a continuous track is formed on each side of the center parts of the core bars.

2. A connecting link type rubber crawler according to claim 1,
    wherein a reinforcing layer is provided in at least one of the positions of above and under the right and left wing portions of the core bar.

3. A connecting link type rubber crawler according to claim 2,
    wherein the center part of the core bar is concave relative to the right and left wing portions.

4. A connecting link type rubber crawler according to claim 2,
    wherein a central lug pad is fixed to the center part of the core bar on the ground side.

5. A connecting link type rubber crawler according to claim 1,
    wherein each of the right and left wing portions of a said core bar has a width, the rubber crawler shoe has a length in the circumferential direction of the crawler, and said width is substantially equal to said length; and
    wherein said core bar is embedded in the rubber crawler shoe.

6. A connecting link type rubber crawler according to claim 5,
    wherein each rubber crawler shoe has an upwardly curved upper face.

7. A connecting link type rubber crawler according to claim 6,
    wherein the center part of the core bar is concave relative to the right and left wing portions.

8. A connecting link type rubber crawler according to claim 5,
    wherein the center part of the core bar is concave relative to the right and left wing portions.

9. A connecting link type rubber crawler according to claim 1,
wherein the center part of the core bar is concave relative to the right and left wing portions.

10. A connecting link type rubber crawler according to claim 1,
wherein a central lug pad is fixed to the center part of the core bar on the ground side.

11. A connecting link type rubber crawler according to claim 10,
wherein the hardness of the central lug pad is 75°–95°, while that of the lug on the wing portions is 55°–85°.

12. A connecting link type rubber crawler according to claim 10,
wherein the central lug pad is removable from the core bar.

13. A connecting link type rubber crawler according to claim 10 or 12,
wherein the central lug pad is made of an elastomeric material having a rigidity and strength on the order of the rigidity and strength of urethane rubber.

14. A connecting link type rubber crawler according to claim 12, wherein the hardness of the central lug pad is 75°–95°, while that of the lug on the wing portions is 55°–85°.

15. A connecting link type rubber crawler according to claim 12,
wherein the central lug pad is made of highly rigid and strong elastic body such as urethane rubber.

16. A connecting link type rubber crawler defining a circumference comprising:
a crawler body defined by a plurality of discrete rubber crawler shoes each defining a length in the circumferential direction of the crawler,
wherein each rubber crawler shoe comprises a core bar and discrete rubber members spaced from one another, the core bar having wing portions, each wing portion being embedded in one of the rubber members such that the rubber member surrounds the wing portion; and
a plurality of track links each having pin holes and an interval between pin holes;
wherein the length of a said rubber crawler shoe in the circumferential direction is substantially equal to the interval between pin holes on both sides of a track link; and
wherein a reinforcing layer is provided in at least one of the positions of above and under the wing portions of the embedded core bars in the rubber crawler shoes; and
wherein the discrete rubber crawler shoes are detachably connected to the track links and are disposed side by side.

17. A connecting link type rubber crawler defining a circumference, comprising:
a crawler body defined by a plurality of discrete rubber crawler shoes each defining a length in the circumferential direction of the crawler,
wherein each rubber crawler shoe comprises a core bar and discrete rubber members spaced from one another, the core bar having wing portions, each wing portion being embedded in one of the rubber members such that the rubber member surrounds the wing portion; and
a plurality of track links each having pin holes and an interval between pin holes;
wherein the length of a said rubber crawler shoe in the circumferential direction is substantially equal to the interval between pin holes on both sides of a track link;
wherein a said core bar has wing portions each having a width substantially equal to the length of the rubber crawler shoe;
is wherein the rubber crawler shoe has a curved upper face; and
wherein the discrete rubber crawler shoes are detachably connected to the track links and are disposed side by side.

18. The connecting link type rubber crawler according to claim 17, wherein the wings are positioned entirely above the horizontal midplane of the rubber elements.

19. A connecting link type rubber crawler defining a circumference comprising:
a crawler body defined by a plurality of discrete rubber crawler shoes each defining a length in the circumferential direction of the crawler;
a core bar embedded in each of the rubber crawler shoes, the core bars having wing portions; and
a plurality of track links each having pin holes and an interval between pin holes,
wherein the length of a said rubber crawler shoe in the circumferential direction is substantially equal to the interval between pin holes on both sides of a track link,
wherein a reinforcing layer is provided in at least one of the positions of above and under the wing portions of the embedded core bars in the rubber crawler shoes,
wherein the discrete rubber crawler shoes are detachably connected to the track links and are disposed side by side, and
wherein the center part of the core bar is concave relative to the right and left wing portions.

20. A connecting link type rubber crawler defining a circumference, comprising:
a crawler body defined by a plurality of discrete rubber crawler shoes each defining a length in the circumferential direction of the crawler;
a core bar embedded in each of the rubber crawler shoes, the core bars having wing portions; and
a plurality of track links each having pin holes and an interval between pin holes,
wherein the length of a said rubber crawler shoe in the circumferential direction is substantially equal to the interval between pin holes on both sides of a track link,
wherein a said core bar has wing portions each having a width substantially equal to the length of the rubber crawler shoe,
wherein the rubber crawler shoe has a curved upper face,
wherein the discrete rubber crawler shoes are detachably connected to the track links and are disposed side by side, and
wherein the center part of the core bar is concave relative to the right and left wing portions.

21. A connecting link type rubber crawler comprising:
a plurality of discrete rubber crawler shoes disposed side by side, each rubber crawler shoe comprising
a core bar including a center part having connecting portions (m), (m) for fixing track links to the core bar and wing portions extending laterally in opposite directions from the center part; and
discrete rubber members spaced from one another, each wing portion being embedded in one of the rubber members such that the rubber member surrounds the wing portion; and a plurality of track links each having connecting portions (m'), (m') for fixing a core bar, the track links being connected with each other so as to define the endless loop, wherein each said rubber crawler shoe has a length for one track link, said connecting portions (m), (m) have an inner side having one of the characteristics of (A) being exposed and (B) being covered with a thin rubber layer, and each of said rubber shoes is detachably connected to a respective one of the track links so as to form the rubber crawler.

22. A connecting link type rubber crawler according to claim 21, wherein the width of each core bar in a width direction parallel to the endless loop of track links is slightly less than the width of the rubber shoe in the same direction.

23. A connecting link type rubber crawler according to claim 21, wherein each rubber shoe has in the width direction thereof side edges positioned close to the side edges of adjacent rubber shoes.

24. A connecting link type rubber crawler according to claim 21, wherein each rubber shoe has a shallow concavity under the wing portions of the core bar.

25. A connecting link type rubber crawler according to claim 21, wherein the core bar is concave.

26. A connecting link type rubber crawler comprising:

a plurality of core bars each including a center part having connecting portions (m), (m) for fixing track links to the core bar and wing portions extending laterally in opposite directions from the center part;

a plurality of track links each having connecting portions (m'),(m') for fixing a core bar, the track links being connected with each other so as to define the endless loop; and a plurality of discrete rubber crawler shoes disposed side by side, wherein said wing portions are embedded in a rubber material, said connecting portions (m), (m) have an inner side having one of the characteristics of (A) being exposed and (B) being covered with a thin rubber layer so as to define a rubber shoe having a length for one track link, and each of said rubber shoes is detachably connected to a respective one of the track links so as to form a rubber crawler; and wherein each rubber shoe has an upper surface curving upwardly in the width direction of the shoe.

27. A connecting link type rubber crawler according to claim 26, wherein said upper surface has side edges protruding beyond the rest of the rubber shoe in the width direction of the shoe.

* * * * *